E. O. C. ORD.
MINER'S GOLD PAN.
APPLICATION FILED MAY 16, 1918.
1,292,364.
Patented Jan. 21, 1919.
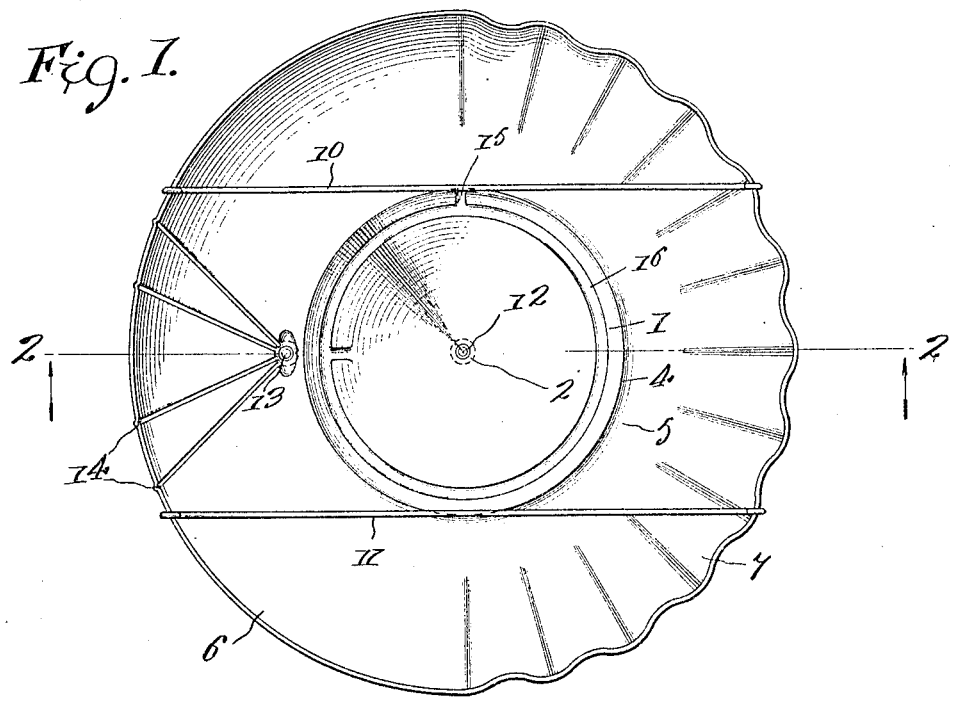
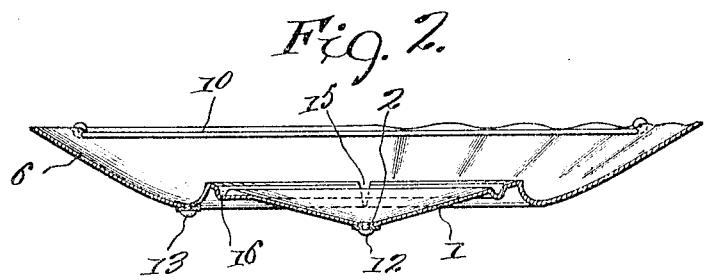
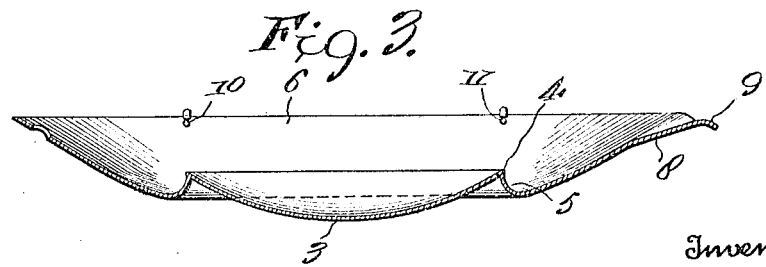
Witness
Edwin J Beller
Inventor
E. O. C. Ord.
by Wilkinson & Giusta.
Attorneys

UNITED STATES PATENT OFFICE.

EDWARD O. C. ORD, OF THE UNITED STATES ARMY.

MINER'S GOLD-PAN.

1,292,364.  Specification of Letters Patent.  Patented Jan. 21, 1919.

Application filed May 16, 1918. Serial No. 234,886.

*To all whom it may concern:*

Be it known that I, EDWARD O. C. ORD, of the United States Army, a citizen of the United States, stationed at Fort Sill, in the county of Comanche and State of Oklahoma, have invented certain new and useful Improvements in Miners' Gold-Pans; and I do hereby declare the following to be a full, clear, and exact description of the invention, such as will enable others skilled in the art to which it appertains to make and use the same.

The present invention relates to improvements in miners' gold pans, and consists in certain improvements over the gold pans shown in my similarly entitled prior United States Patents Nos. 1,064,853 and 1,064,854, granted June 17, 1913.

It is an object of the present invention to provide a gold pan so constructed that a whirling, spinning or centrifugal motion may be readily imparted thereto, and this motion arrested and reversed in direction quickly in order to effectively and expeditiously recover the gold from the gangue.

Another object of the present invention consists in so constructing the gold pan as to provide for receiving and separating large quantities of heavy material, in which use the pan is adapted to be suspended from above and allowed to rest on a central pivot point about which the operator may conveniently rotate same.

In the accompanying drawings forming a part of this application, and in which similar reference symbols indicate corresponding parts in the several views:

Figure 1 shows a top plan view of an improved miner's gold pan constructed in accordance with my present invention.

Fig. 2 is a sectional view through the pan taken on the line 2—2 in Fig. 1; and

Fig. 3 is a similar sectional view taken at right angles to Fig. 2, and showing a slight modification of the pan.

Referring more particularly to the drawings, 1 designates the bottom or central portion of the pan which is depressed to form a vanner having a generally conical form with its apex 2 extending below the level of adjacent parts of the pan, as shown in Fig. 2; such apex forming a center to support the pan and about which the pan may be readily made to rotate in either direction.

In Fig. 3 the vanner 1 is likewise shown to be of a generally conical contour, but the true conical form may be departed from by constructing the pivotal point rounded as indicated at 3. These points 2 and 3 also provide means on which the pan may be rocked for certain separating purposes.

At the outer peripheral edges 4 of the vanner 1, the pan is depressed radially outward to provide an annular trough or channel which extends about the vanner 1 and forms a waterway, as hereinafter more fully described.

The peripheral walls 6 of the pan extend radially outward and diverge upwardly from the bottom of the channel or trough 5, for which see Figs. 2 and 3.

As much as is desirable of the peripheral walls 6 are fluted. In Fig. 1 that half of the pan peripheral walls 6 shown at 7 are fluted in the manner illustrated.

A thumb hole 8, shown in Fig. 3, is also provided at a convenient point in the peripheral walls 6 of the pan, and a lip 9 preferably extends from this thumb hole to enable the operator to drain off the water from the pan into a canteen, where it may be held for re-use when desired.

The walls 6 are also perforated to receive rods 10 and 11 which pass therethrough and extend through the upper part of the pan. These rods provide for engagement by the hand to assist in rocking or rotating the pan, and they also provide a convenient means whereby suspending cables may be attached to the pan where heavy material is to be separated. These rods are secured in position by any suitable fastening means.

To avoid the necessity of scraping the recovered gold from the bottom of the vanner 1, I preferably provide a tap hole at the pivotal part 2 or 3 of the same, which may be closed by a set screw or other appropriate means 12. In like manner the trough or channel 5 is also preferably provided with one or more tap holes also closed by set screws or other suitable means 13.

In use the material to be separated, such for instance as crushed quartz samples or metalliferous gravel is placed in the central vanner 1, with water and the trough or channel 5 is filled with water; whereupon the pan is tilted from side to side, which causes the water in the trough to pass in waves over the central vanner, in this way washing the original sample gently out of the vanner until nothing remains there except the metal contents of the original sample, the sand and gravel having been washed into the annular channel or trough 5. The water is then poured out of the pan through the thumb hole 8 and lip 9 into a canteen or other receptacle, and saved for another panning.

This utilizing of water for subsequent panning operations is a great saving for the prospector in time and labor in arid countries. The loose gravel and sand is removed from time to time by hand from the annular trough or channel 5, which, as shown, is preferably curved along its bottom to facilitate easy removal of same when but little remains.

The fluted sides are for use as bumpers when washing muddy or clayey gravel which, by coming in contact therewith, is subjected to repeated shocks that facilitate the removal of the mud or clay from the gravel.

The fan shaped channels "14" Fig. 1 on the wall concentrate the metallic particles to the bottom and when panning in the ordinary way, prevent escape of float gold, when "cleaning up" the trough 5, concentrates in a final washing.

A great advantage I secure in the use of a pan of this form for placer mining lies in the double concentration afforded by the vanner 1, and trough or channel 5. The larger and heavier particles in the pan, when filled to convenient capacity, pass into the channel 5, are subjected to centrifugal action and are thrown against the wall 6, and out of the pan when slightly tilted, while the finer particles in the depressed vanner at the same time undergo a separation by reason of the agitation produced by the motion of the pan. If desirable the central vanner may be fitted with a wire screen cap, which may fit horizontally over the bottom of the pan or may be fitted over the vanner solely, the object of which is to exclude the larger pebbles.

As hereinbefore described, the pan rests upon the central pivot point and thus enables a circular or whirling motion to be given the same, involving but little friction. This motion may be made to take place in alternately opposite directions, and where light material is treated the pan need not be suspended from above. This motion concentrates the metallic particles to the bottom at each change of motion, while the centrifugal action, due to the circular motion, holds the particles apart and in suspension, partly overcoming gravitation and compelling all of the several particles to take position in accordince with their density.

When a large charge of heavy material is to be separated, however, suitable cables or other suspending means may be attached to the rods 10 and 11 in such a way that the pan will rest upon the central pivotal part, and in this way the prospector is relieved of the burden of supporting the pan, so that his attention may be given solely to imparting the necessary tilting or alternating rotary movement thereto.

For rough placer gold panning the pan may be used in the ordinary way, the waste escaping over the edge of the pan. When heavy loads are essential to a good day's continuous work, the pan suspended or resting on the center depression may be operated either out of the water or in it and under the water by means of rope handles attached to the cross bars 10 and 11, in case the water be too icy for safely entering the hands.

A great advantage I secure in the use of a pan of this form is not only in the double concentration afforded by vanner 1, and trough 5, but also in the ready means for removal of these concentrates at any time either during the process of vanning or after it has been completed by opening the tap holes 12 and 13, on removing most of the water from the pan. The unwashed portion of the charge of gravel, or ore, in the pan does not have to be disturbed in order to obtain the accumulated concentrates that have formed in the central vanner 1, or those from the tap hole 13, where a small trap is provided into which the concentrates may settle.

The great advantages of my new gold pan lie in the double concentration of the particles afforded the quartz miner and prospector; and the assayer and chemist who require finer separation of the gold contents of an ore and frequently division of the separation into several classes of different metals, grades or qualities of value according to their density; for instance, copper carbonates which are light from pyrite or sulfids; zinc from lead; and iron sulfids from gold; all of which can be neatly accomplished in my gold pan.

For laboratory work a narrow channel 15 is provided connecting the outer trough with the lower central vanner, thus enabling repeated washings from the outer channel to enter readily the center vanner and permit of oil flotation tests on sand concentrates as obtained.

Similarly connected, an additional annular trough 16 may be placed in the bottom of the pan.

It is obvious that those skilled in the art may vary the details of construction and arrangements of parts without departing from the spirit of my invention, and therefore I do not wish to be limited to such features except as may be required by the claims.

I claim:

1. A miner's gold pan provided with a depressed concave central bottom portion of generally conical form, and an annular trough arranged about the said depressed bottom portion, said trough having its bottom above the lowest part of the concave central portion, substantially as described.

2. A miner's gold pan provided with a depressed center of a generally conical form, an annular trough surrounding said depressed center, and a radially fluted peripheral wall forming the outer side of said trough, substantially as described.

3. A miner's gold pan provided with a radially fluted inclined peripheral wall, the fluting on said wall extending from the upper portion of and merging into the smooth conical surface of said wall at some distance from the bottom of said trough, substantially as described.

4. A miner's gold pan provided with a depressed central vanner, an annular trough arranged about said vanner, inclined peripheral walls extending from the bottom of said trough, and fixed hand rods passing through and attached to said peripheral walls near their tops and at substantially the opposite sides of said pan, substantially as described.

5. A miner's value separating pan, comprising a substantially bowl-shaped member having ore separating features included therein, and one or more brace hand rods extending transversely of said pan and engaging substantially the opposite upper sides thereof, substantially as described.

6. A miner's gold pan provided with a concave center, an annular channel surrounding said concave center, the bottom of said channel being above the level of the concave center of the pan, the said channel being provided with a tap hole for the removal of any concentrates found in said channel, substantially as described.

7. A miner's gold pan having a central concave portion surrounded by an annular trough, said trough being surrounded by an inclined peripheral wall, the said wall being provided with a series of inclined channels radiating upward and outward from a common point near the bottom of said trough, and said trough being provided with a drain opening near said common point, substantially as described.

8. A miner's gold pan having a depressed central chamber, a plurality of concentric annular troughs arranged about said central chamber, and an outer inclined peripheral wall, said troughs and said central chamber being provided with a series of connecting overflow passages, substantially as described.

9. A miner's gold pan having a depressed central chamber, a plurality of concentric annular troughs arranged about said central chamber, and an outer inclined peripheral wall, said troughs and said central chamber being provided with a series of connecting overflow passages, and said peripheral wall being provided with a fan-shaped series of grooves radiating from the central portion of the outer trough and extending to the edge of the pan, and with a tap hole at the lower end of said series of grooves, substantially as described.

10. A miner's gold pan provided with an inclined peripheral wall, said wall having a series of inclined channels radiating upward and outward from a common point near the bottom of said wall, and a pocket located at the junction of said channels, substantially as described.

In testimony whereof, I affix my signature.

EDWARD O. C. ORD.

Copies of this patent may be obtained for five cents each, by addressing the "Commissioner of Patents, Washington, D. C."